US012657806B2

(12) United States Patent
Chen

(10) Patent No.: US 12,657,806 B2
(45) Date of Patent: Jun. 16, 2026

(54) IMAGE RENDERING METHOD, ELECTRONIC DEVICE, AND STORAGE MEDIUM

(71) Applicant: Beijing Zitiao Network Technology Co., Ltd., Beijing (CN)

(72) Inventor: Yixin Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 158 days.

(21) Appl. No.: 18/730,733

(22) PCT Filed: Jan. 13, 2023

(86) PCT No.: PCT/CN2023/072085
§ 371 (c)(1),
(2) Date: Jul. 19, 2024

(87) PCT Pub. No.: WO2023/138504
PCT Pub. Date: Jul. 27, 2023

(65) Prior Publication Data
US 2025/0232513 A1     Jul. 17, 2025

(30) Foreign Application Priority Data
Jan. 21, 2022    (CN) .......................... 202210074077.8

(51) Int. Cl.
*G06T 15/00*          (2011.01)
*G06T 13/20*          (2011.01)
(52) U.S. Cl.
CPC ............ *G06T 15/005* (2013.01); *G06T 13/20* (2013.01)

(58) Field of Classification Search
None
See application file for complete search history.

(56) References Cited

U.S. PATENT DOCUMENTS

| | | | | |
|---|---|---|---|---|
| 2017/0323475 A1* | 11/2017 | Moreton | ................. | G06T 15/20 |
| 2020/0380769 A1* | 12/2020 | Liu | ......................... | G06V 40/20 |
| 2022/0230383 A1* | 7/2022 | Tian | ....................... | G06V 10/26 |

FOREIGN PATENT DOCUMENTS

| | | |
|---|---|---|
| CN | 102523473 A | 6/2012 |
| CN | 102799435 A | 11/2012 |

(Continued)

OTHER PUBLICATIONS

China National Intellectual Property Administration, Office Action Issued in Application No. 202210074077.8, Sep. 15, 2024, 13 pages.

(Continued)

*Primary Examiner* — Robert J Craddock
(74) *Attorney, Agent, or Firm* — Alleman Hall LLP

(57) ABSTRACT

The present disclosure provides an image rendering method and apparatus, a device, and a medium. The method including: in response to acquiring an interactive operation instruction from a user to control movement of a target rendering object, updating depth information of a first node; determining target coordinates of the first node in a world coordinate system, according to the depth information and screen coordinates of a movement trajectory corresponding to the interactive operation instruction; and based on the target coordinates and world coordinate system coordinates of a plurality of nodes, concurrently updating world coordinate system coordinates of the plurality of nodes, and controlling the plurality of nodes to rotate according to a preset model node rotation strategy to render the target rendering object.

20 Claims, 5 Drawing Sheets

(56)            References Cited

FOREIGN PATENT DOCUMENTS

| | | | |
|---|---|---|---|
| CN | 102902848 | A | 1/2013 |
| CN | 105915885 | A | 8/2016 |
| CN | 109448117 | A | 3/2019 |
| CN | 110111235 | A | 8/2019 |
| CN | 110221690 | A | 9/2019 |
| CN | 111028362 | A | 4/2020 |
| CN | 112933597 | A | 6/2021 |
| CN | 113643414 | A | 11/2021 |
| CN | 114419230 | A | 4/2022 |
| KR | 1020210120315 | A | 10/2021 |

OTHER PUBLICATIONS

Zhao, D. et al. "Luminance and Depth Based Real-time Depth of Field Rendering Algorithm," Journal of System Simulation, vol. 24, No. 8, Aug. 2012, 14 pages.
ISA China National Intellectual Property Administration, International Search Report Issued in Application No. PCT/CN2023/072085, Apr. 14, 2023, 10 pages.

* cited by examiner

During a display process of a target rendering object, after acquiring an interactive operation instruction from a user to control movement of the target rendering object, updating depth information of a first node of a three-dimensional model of the target rendering object in a current frame for each frame of the target rendering object ~~~ S110

Determining target coordinates of the first node in a world coordinate system corresponding to the current frame, according to the depth information and screen coordinates of a movement trajectory corresponding to the interactive operation instruction in the current frame ~~~ S120

Based on the target coordinates and world coordinate system coordinates of a plurality of nodes in the three-dimensional model in a previous frame of the current frame, concurrently updating world coordinate system coordinates of the plurality of nodes in the current frame, and controlling, during a coordinate updating process, the plurality of nodes to rotate according to a preset model node rotation strategy to render the target rendering object ~~~ S130

Fig. 1

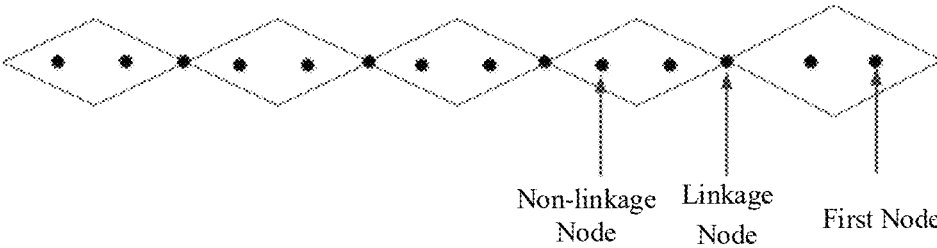

Non-linkage    Linkage
Node           Node       First Node

Fig. 2

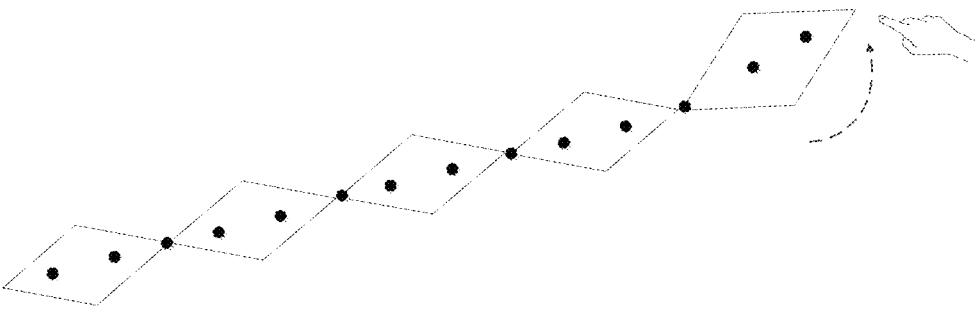

Fig. 3

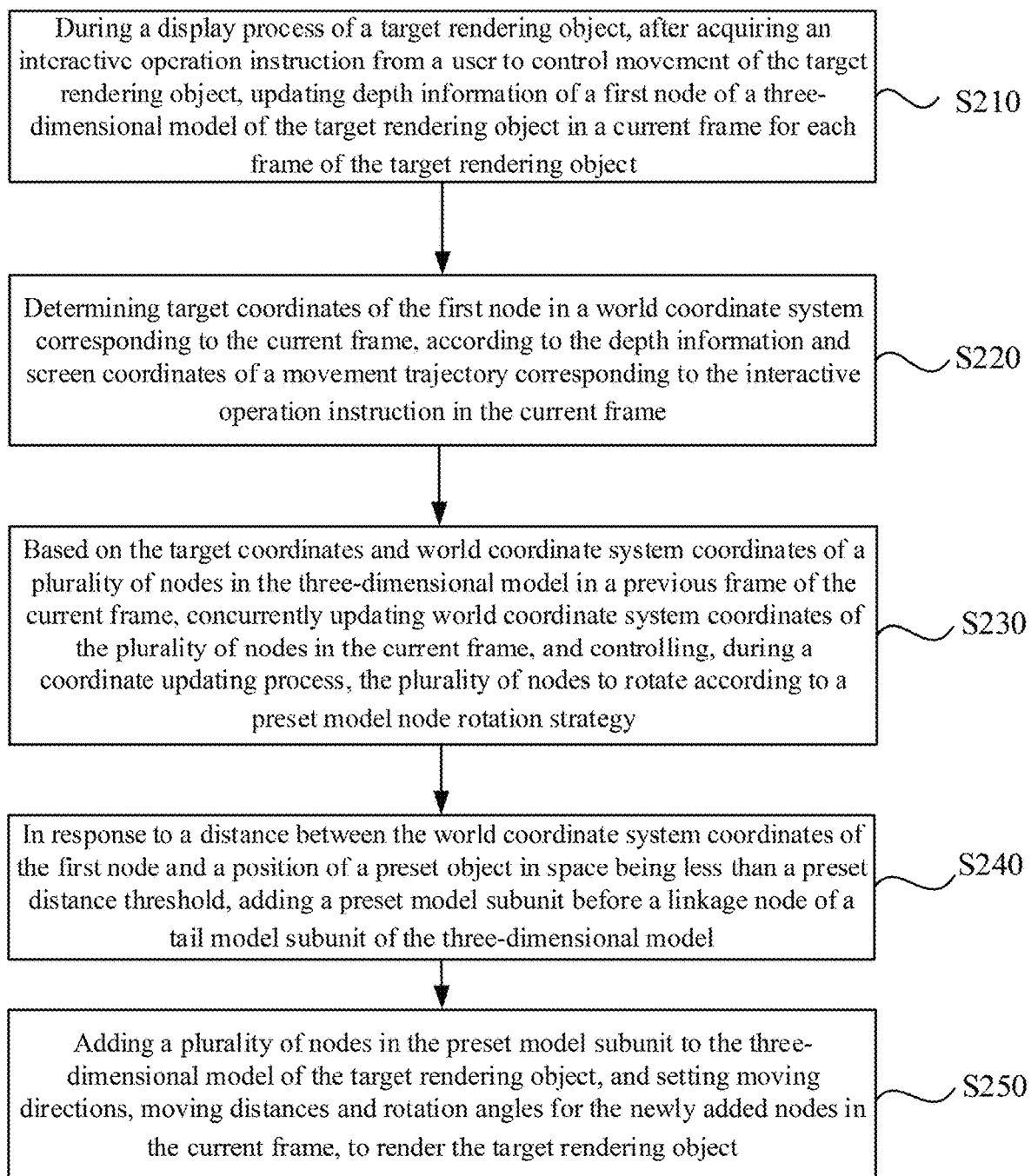

During a display process of a target rendering object, after acquiring an interactive operation instruction from a user to control movement of the target rendering object, updating depth information of a first node of a three-dimensional model of the target rendering object in a current frame for each frame of the target rendering object ⟶ S210

Determining target coordinates of the first node in a world coordinate system corresponding to the current frame, according to the depth information and screen coordinates of a movement trajectory corresponding to the interactive operation instruction in the current frame ⟶ S220

Based on the target coordinates and world coordinate system coordinates of a plurality of nodes in the three-dimensional model in a previous frame of the current frame, concurrently updating world coordinate system coordinates of the plurality of nodes in the current frame, and controlling, during a coordinate updating process, the plurality of nodes to rotate according to a preset model node rotation strategy ⟶ S230

In response to a distance between the world coordinate system coordinates of the first node and a position of a preset object in space being less than a preset distance threshold, adding a preset model subunit before a linkage node of a tail model subunit of the three-dimensional model ⟶ S240

Adding a plurality of nodes in the preset model subunit to the three-dimensional model of the target rendering object, and setting moving directions, moving distances and rotation angles for the newly added nodes in the current frame, to render the target rendering object ⟶ S250

Fig. 4

IMAGE RENDERING METHOD, ELECTRONIC DEVICE, AND STORAGE MEDIUM

CROSS REFERENCE TO RELATED APPLICATIONS

The present disclosure is a U.S. national stage application of International Patent Application No. PCT/CN2023/072085, filed on Jan. 13, 2023, which claims priority of the Chinese Patent Application No. 202210074077.8 filed with the Chinese Patent Office on Jan. 21, 2022, the disclosures of both of which are incorporated by reference in their entireties.

TECHNICAL FIELD

The present disclosure relates to the technical field of image processing, and for example, relates to an image rendering method and apparatus, an electronic device, and a storage medium.

BACKGROUND

During a process of rendering a three-dimensional image, depth information is mostly added on the basis of coordinate information of pixel points of a two-dimensional image, and a corresponding three-dimensional image is generated by rendering. In some scenarios involving interactions with stickers or props, it is necessary to make a rendering object produce a dynamically and continuously changing three-dimensional rendering effect during the interaction with a user. However, there is no good solution, which can achieve a three-dimensional dynamic image rendering effect in which the rendering object itself dynamically changes while the rendering object moves according to a trajectory.

SUMMARY

The present disclosure provides an image rendering method and apparatus, an electronic device, and a storage medium, which is capable of achieving a rendering method in a three-dimensional space with depth, so that a rendering object presents depth changes during a moving process along a corresponding trajectory, and different parts of the rendering object will also perform curved movements during the moving process along the corresponding trajectory.

In a first aspect, the present disclosure provides an image rendering method, including:

during a display process of a target rendering object, after acquiring an interactive operation instruction from a user to control movement of the target rendering object, updating depth information of a first node of a three-dimensional model of the target rendering object in a current frame for each frame of the target rendering object;

determining target coordinates of the first node in a world coordinate system corresponding to the current frame, according to the depth information and screen coordinates of a movement trajectory corresponding to the interactive operation instruction in the current frame; and based on the target coordinates and world coordinate system coordinates of a plurality of nodes in the three-dimensional model in a previous frame of the current frame, concurrently updating world coordinate system coordinates of the plurality of nodes in the current frame, and controlling, during a coordinate updating process, the plurality of nodes to rotate according to a preset model node rotation strategy to render the target rendering object In a second aspect, the present disclosure further provides an image rendering apparatus, including:

a depth information updating module, configured to, during a display process of a target rendering object, after acquiring an interactive operation instruction from a user to control movement of the target rendering object, update depth information of a first node of a three-dimensional model of the target rendering object in a current frame for each frame of the target rendering object;

a rendering guidance coordinate determination module, configured to determine target coordinates of the first node in a world coordinate system corresponding to the current frame, according to the depth information and screen coordinates of a movement trajectory corresponding to the interactive operation instruction in the current frame; and an image rendering module, configured to, based on the target coordinates and world coordinate system coordinates of a plurality of nodes in the three-dimensional model in a previous frame of the current frame, concurrently update world coordinate system coordinates of the plurality of nodes in the current frame, and control, during a coordinate updating process, the plurality of nodes to rotate according to a preset model node rotation strategy to render the target rendering object.

In a third aspect, the present disclosure further provides an electronic device, including:

at least one processor; and a storage apparatus, configured to store at least one program, where the at least one program, when executed by the at least one processor, enables the at least one processor to implement the above-mentioned image rendering methods.

In a fourth aspect, the present disclosure further provides a storage medium including computer-executable instructions, and the computer-executable instructions, when executed by a computer processor, are configured to execute the above-mentioned image rendering methods.

In a fifth aspect, the present disclosure further provides a computer program product including a computer program carried on a non-transitory computer-readable medium, and the computer program includes program code for executing the above-mentioned image rendering methods.

BRIEF DESCRIPTION OF DRAWINGS

FIG. 1 is a schematic flowchart of an image rendering method provided by at least one embodiment of the present disclosure;

FIG. 2 is a schematic plan view of nodes of a rendering object provided by at least one embodiment of the present disclosure;

FIG. 3 is a schematic plane view of a dynamic change of a two-dimensional rendering object under an interactive operation instruction of a user, provided by at least one embodiment of the present disclosure;

FIG. 4 is a schematic flowchart of another image rendering method provided by at least one embodiment of the present disclosure;

DETAILED DESCRIPTION

Figure 5:
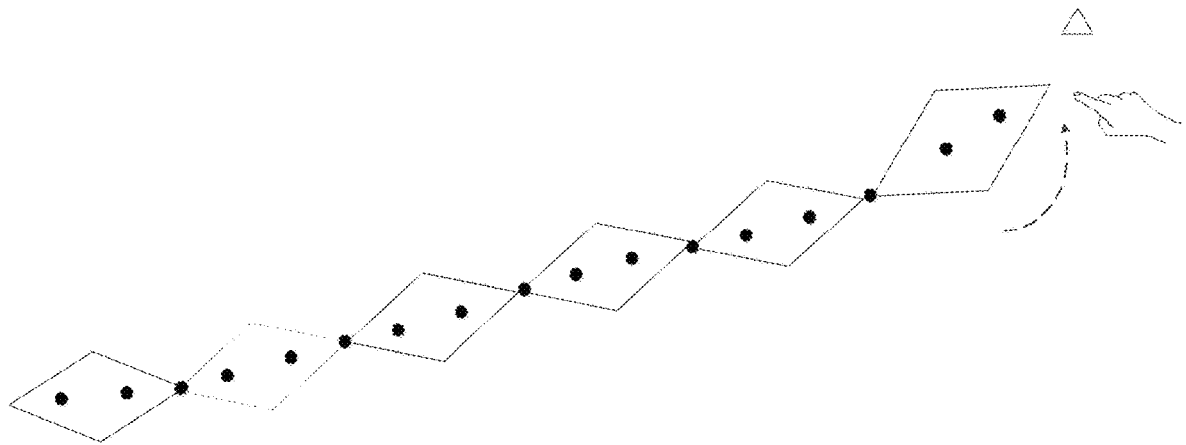
FIG. 5 is a schematic diagram of a first node approaching a position of a preset object in space provided by at least one embodiment of the present disclosure.

Embodiments of the present disclosure will be described below with reference to the drawings. Although some embodiments of the present disclosure are shown in the drawings, the present disclosure may be embodied in various forms, and these embodiments are provided for understanding the present disclosure. The drawings and embodiments of the present disclosure are for exemplary purposes only.

Various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

Concepts such as the "first," "second," or the like mentioned in the present disclosure are only used to distinguish different devices, modules or units, and are not used to limit the interdependence relationship or the order of functions performed by these devices, modules or units.

The modifications of "a," "an," "a plurality of," or the like mentioned in the present disclosure are illustrative rather than restrictive, and those skilled in the art should understand that unless the context clearly indicates otherwise, these modifications should be understood as "one or more."

FIG. 1 is a schematic flowchart of an image rendering method provided by at least one embodiment of the present disclosure. The embodiment of the present disclosure is suitable for dynamic three-dimensional image rendering scenarios, for example, suitable for dynamic three-dimensional image rendering in some scenarios such as mini games, effects or props that enable interaction with users. The method may be performed by an image rendering apparatus, which may be embodied in the form of software and/or hardware, and may be configured in an electronic device, such as a mobile terminal or a server device.

As shown in FIG. 1, the image rendering method provided by the present embodiment includes:

S110: during a display process of a target rendering object, after acquiring an interactive operation instruction from a user to control movement of the target rendering object, updating depth information of a first node of a three-dimensional model of the target rendering object in a current frame for each frame of the target rendering object.

In social media applications, such as a short video platform, in order to increase the interest and interactivity of the user in using social media, a plurality of interactive mini games, video capturing props such as various types of dynamic stickers and the like are provided to create interactive content with the user.

In the present embodiment, the target rendering object may be an interactive video prop or an interactive animation. In the present embodiment, the target rendering object is a three-dimensional object with depth information. When the user opens the video prop or animation corresponding to the target rendering object, a target display object will be displayed in an initial state of the target display object in an interactive interface of an application client, and the initial state of the target display object may be a preset three-dimensional image with initial depth information. A three-dimensional model of the target display object may be a corresponding model established in advance according to a preset scenario, a topic and other related contents, such as a three-dimensional animal model, a three-dimensional food model or a daily necessities model.

The user may interact with the target rendering object in an interactive interface of a terminal displaying the target rendering object, by way of tapping, long pressing, dragging, or gesture recognition. The gesture recognition means triggering an interactive operation instruction on the target rendering object by identifying a gesture of a user (including facial movements), for example, changing a movement trajectory of the target rendering object through a movement trajectory of a hand.

When the interactive operation instruction from a user to control movement of the target rendering object is acquired, it indicates that an initial rendering display state of the target rendering object begins to change. Therefore, it is necessary to update the depth information changes of the target rendering object after the change, to dynamically render and update the display effect of the target rendering object in response to the interactive operation instruction from the user.

In the initial rendering state of the target rendering object, each skeletal node in its three-dimensional model has an initial depth value, and the depth value is a constant, indicating a depth from a display interface of a terminal screen to a camera. By setting the corresponding depth constant value, a distance between the target rendering object and the display interface of the terminal screen may be adjusted. In the present embodiment, a change amount of the depth is related to time when the target rendering object starts to be displayed or time when the user interacts with the target rendering object, and the depth may be changed correspondingly according to the time value; for example, a sine value of a cumulative duration of the display of the target rendering object or a cumulative duration of the interaction between the user and the target rendering object is taken, and numerical operation is performed with the depth constant on this basis, to finally obtain the updated depth information. In one embodiment, an updated depth value (zDistance) may be expressed as: $zDistance=DIS\_BASE+sin(time)*DIS\_BASE/5$, where DIS_BASE is a depth constant, and time is cumulative time from the start of display or interaction of the target rendering object to the current display of the image frame of the target rendering object.

The acquired depth information is depth information of the first node in the three-dimensional model of the target rendering object. The first node is a skeletal node of a starting part of the target rendering object when the target rendering object changes dynamically, and other skeletal nodes change continuously under the conduction of the change of position information of the first node according to a corresponding preset node order, to achieve the overall change of the target rendering object. In FIG. 2, an initial display state of the target rendering object is shown in the form of a two-dimensional plane image. This plane may be a coronal plane where a plurality of nodes of the target rendering object are located. The target rendering object includes a plurality of model subunits (diamond blocks) as a whole, and black dots exemplarily show skeletal nodes of the target rendering object. The skeletal nodes include linkage nodes and non-linkage nodes. The linkage node is a node configured to link two model subunits together, and the non-linkage node is a node within a model subunit. When two model subunits are linked, the two corresponding linkage nodes are directly overlapped.

When the user interacts with the target rendering object in any feasible way, for example, dragging the target rendering object to move, then the target rendering object will move from the model subunit where the first node is located. As shown in FIG. 3, when the user moves along a curved trajectory indicated by a curved dotted line through a gesture, the target rendering object will also move along with the corresponding trajectory. The presentation of a final rendering effect is implemented by calculating position information of the plurality of nodes according to the depth change and the spatial coordinate position change of the first node in the following steps. The contents in FIG. 2 and FIG. 3 do not include depth information and are not the final rendering effect, and only facilitate the explanation of a rendering process.

S120: determining target coordinates of the first node in a world coordinate system corresponding to the current frame, according to the depth information and screen coordinates of a movement trajectory corresponding to the interactive operation instruction in the current frame.

When the target rendering object moves in response to the interactive operation instruction of the user, the target rendering object moves with the movement trajectory of the user's finger on a screen or a corresponding trajectory of the gesture on the screen. Then, in each frame, coordinates of the finger on the terminal interface are target coordinates to which the first node moves. That is, the target coordinates are a movement guide of the first node, and the first node will move close to the target coordinates, even be coincided with the target coordinates; then, other nodes sequentially follow the path traversed by the first node.

When the user interacts with the target rendering object through the terminal interface, the screen coordinates of the movement trajectory of the user gesture in the current frame may be acquired in real time. Then, the target coordinates of the first node in the world coordinate system may be obtained by coordinate operation combined with the depth information.

S130: based on the target coordinates and world coordinate system coordinates of a plurality of nodes in the three-dimensional model in a previous frame of the current frame, concurrently updating world coordinate system coordinates of the plurality of nodes in the current frame, and controlling, during a coordinate updating process, the plurality of nodes to rotate according to a preset model node rotation strategy to render the target rendering object.

The rendering process of the target rendering object is a process of calculating and updating rendering parameters such as coordinate values of a plurality of nodes in the three-dimensional model of the target rendering object in combination with the dynamic changes of the target coordinates in each frame of displaying the target rendering object.

First, because the movement of the first node starts from the coordinate position in the previous frame to the target coordinates of the current frame, it is possible to determine the moving direction and the moving distance of the first node according to world coordinate system coordinates of the first node in the previous frame and the target coordinates, and cause the first node to move by the corresponding moving distance in the corresponding moving direction to complete coordinate updating of the first node in the current frame.

The moving direction and the moving distance of the first node are based on a first coordinate vector between the world coordinate system coordinates of the first node in the previous frame and the target coordinates, and the vector direction is directed to the target coordinates from the world coordinate system coordinates of the first node in the previous frame. The first coordinate vector $V1$ may be expressed as $V1=(\text{targetPos}-\text{pos1})$, where targetPos represents the target coordinates and pos1 represents the world coordinate system coordinates of the first node in the previous frame. Then, the vector direction of the first coordinate vector may be taken as the moving direction of the first node, that is, the direction of $V1$ is the moving direction of the first node. As for the moving distance in the $V1$ direction, the unit distance of pixel movement between two adjacent image frames and the length of the vector $V1$ are to be considered. First, the relationship between a preset pixel movement unit distance and the vector length of the first coordinate vector $V1$ may be determined. The preset pixel movement unit distance is taken as the moving distance of the first node in the corresponding moving direction in response to the preset pixel movement unit distance being less than or equal to the vector length of the first coordinate vector, and the vector length of the first coordinate vector is taken as the moving distance of the first node in the corresponding moving direction in response to the preset pixel movement unit distance being greater than the vector length of the first coordinate vector, that is, the moving distance of the first node in the vector direction of $V1$ does not exceed the length of the vector $V1$.

The world coordinate system coordinates of a plurality of nodes excluding the first node in the current frame are also updated concurrently. Each node excluding the first node also moves towards the position of a previous node adjacent to the node. Then, for the plurality of nodes excluding the first node, the moving direction and the moving distance of each node may be determined according to world coordinate system coordinates of each node and a previous node adjacent to each node in the previous frame, and each node is enabled to move by the corresponding moving distance in the corresponding moving direction, to complete coordinate updating of the plurality of nodes in the current frame. The moving directions and the moving distances of the plurality of nodes excluding the first node may be determined according to a second coordinate vector $V2$ between the world coordinate system coordinates of each node and the previous node adjacent to each node in the previous frame; then, the vector direction of the second coordinate vector is taken as the moving direction of the each node; in response to the preset pixel movement unit distance being less than or equal to a vector length of the second coordinate vector, the preset pixel movement unit distance is taken as the moving distance of each node in the corresponding moving direction; and in response to the preset pixel movement unit distance being greater than the vector length of the second coordinate vector, the vector length of the second coordinate vector is taken as the moving distance of each node in the corresponding moving direction. That is, between two adjacent frames of images, the pixel movement unit distances corresponding to different pixels are consistent, that is, the moving distances of the plurality of nodes in their respective moving directions are consistent.

However, the plurality of nodes excluding the first node include linkage nodes and non-linkage nodes (as shown in FIG. 2). When determining the moving distance of the non-linkage node in the corresponding moving direction, a preset distance between nodes should be considered; after the non-linkage node moves, the distance between adjacent non-linkage nodes cannot be less than the preset distance between nodes; that is, the difference between the vector length of V2 and the moving distance in the corresponding moving direction of the non-linkage node should be greater than or equal to the preset distance between nodes. Therefore, during the process of determining the moving distance of the non-linkage node, firstly, it is necessary to determine whether the distance difference between the vector length of the second coordinate vector and a preset distance between adjacent nodes is greater than or equal to the preset pixel movement unit distance; in response to the distance difference between the vector length of the second coordinate vector and the preset distance between adjacent nodes being greater than or equal to the preset pixel movement unit distance, the preset pixel movement unit distance is taken as the moving distance of the non-linkage node in the vector direction of the second coordinate vector; and in response to the distance difference between the vector length of the second coordinate vector and the preset distance between adjacent nodes being less than the preset pixel movement unit distance, the distance difference is taken as the moving distance of the non-linkage node in the vector direction of the second coordinate vector.

After the moving directions and the moving distances of the plurality of nodes are determined concurrently, the plurality of nodes can complete the moving process, and the world coordinate system coordinates of the plurality of nodes in the current frame may be updated after the movement is completed.

In the present embodiment, the plurality of nodes also rotate around a coordinate axis of the three-dimensional model itself during the moving process, to implement the visual rendering effect of spirally moving forward. Different rotation strategies are set for different nodes. During the process of the first node moving the corresponding moving distance in the corresponding moving direction, the first node is controlled, towards the vector direction of the first coordinate vector, to rotate a preset angle around a preset coordinate axis of the target rendering object. The preset angle is a fixed angle value, and the same angle is rotated in every rotation. During the process of the plurality of nodes excluding the first node moving the corresponding moving distance in the corresponding moving direction, each node is controlled, towards the vector direction of the second coordinate vector, to rotate a rotation angle around the preset coordinate axis of the target rendering object, and the rotation angle is an angle of the previous node adjacent to each node rotates during the coordinate updating process in the previous frame. For non-linkage nodes among the plurality of nodes excluding the first node, during the process of each non-linkage node moving the corresponding moving distance in the corresponding moving direction, the non-linkage node is controlled to rotate a rotation angle towards a vector direction of a third coordinate vector between a next node and a previous node adjacent to the non-linkage node in the previous frame, and the rotation angle is less than or equal to an angle of the previous node adjacent to the non-linkage node rotates during the coordinate updating process in the previous frame. Such settings may make the rotational rendering effect smoother and less abrupt.

According to the technical solutions of the embodiments of the present disclosure, if the user interacts with the target rendering object during the display process of the target rendering object, the interactive operation instruction from the user to control movement of the target rendering object may be acquired; then, during the interaction process of controlling movement of the target rendering object by the user, depth information of the first node of the three-dimensional model of the target rendering object in the current frame is updated for each frame of the target rendering object; the target coordinates of the first node in the world coordinate system corresponding to the current frame are determined according to the depth information and screen coordinates of a movement trajectory corresponding to the interactive operation instruction in the current frame; and by taking the target coordinates as an overall moving target position of the target rendering object, based on the target coordinates and world coordinate system coordinates of a plurality of nodes in the three-dimensional model in a previous frame of the current frame, world coordinate system coordinates of the plurality of nodes in the current frame are concurrently updated, and during the coordinate updating process, the plurality of nodes are controlled to rotate according to the preset model node rotation strategy to render the target rendering object, so that the rendering effect of the dynamic depth change and spiral motion may be obtained. The technical solutions of the embodiments of the present disclosure fill the gap in dynamic three-dimensional image rendering solution with depth variation, achieving a rendering method in a three-dimensional space with depth, so that the rendering object presents depth variation during a moving process of the corresponding trajectory, and different parts of the rendering object also perform curvilinear motion during the moving process of the corresponding trajectory.

The embodiment of the present disclosure may be combined with the solution in the image rendering method provided by the above-mentioned embodiment. The image rendering method provided by the present embodiment describes a dynamic rendering process of a three-dimensional image in a scenario with additional model subunits.

FIG. 4 is a schematic flowchart of another image rendering method provided by at least one embodiment of the present disclosure. As shown in FIG. 4, the image rendering method provided by the present embodiment includes:

S210: during a display process of a target rendering object, after acquiring an interactive operation instruction from a user to control movement of the target rendering object, updating depth information of a first node of a three-dimensional model of the target rendering object in a current frame for each frame of the target rendering object.

S220: determining target coordinates of the first node in a world coordinate system corresponding to the current frame, according to the depth information and screen coordinates of a movement trajectory corresponding to the interactive operation instruction in the current frame.

S230: based on the target coordinates and world coordinate system coordinates of a plurality of nodes in the three-dimensional model in a previous frame of the current frame, concurrently updating world coordinate system coordinates of the plurality of nodes in the current frame, and controlling, during a coordinate updating process, the plurality of nodes to rotate according to a preset model node rotation strategy.

S240: in response to a distance between the world coordinate system coordinates of the first node and a position of a preset object in space being less than a preset distance threshold, adding a preset model subunit before a linkage node of a tail model subunit of the three-dimensional model.

The preset objects in space are preset objects with depth information, which may be randomly provided at a plurality of positions in the space where the target rendering object is displayed, or may be provided at a plurality of positions in the space according to a certain setting strategy. In response to the distance between the first node and the preset object in space being less than the preset distance threshold, a model updating instruction of the target rendering object will be triggered. During the process of interacting with the target rendering object, the user may drag the target rendering object to preset objects in a plurality of spaces according to a certain movement trajectory. Therefore, during a process of rendering the target rendering object by a client, one model subunit will be added to the three-dimensional model of the target rendering object when the model updating instruction is received. From the rendering effect of model updating, it is equivalent to increasing the three-dimensional model of the target rendering object to some extent in one dimension, such as increasing the height and the length. The preset object in the space may be set to the form or content associated with prop scenarios, for example, in some mini games, such as the Gluttonous Snake, the target rendering object is controlled to move to get food or game scores.

In the present embodiment, when a model subunit is added, for example, from the tail of the model, it will not affect the moving state of the previous node. One preset model subunit may be added before the linkage node of the tail model subunit of the three-dimensional model of the target rendering object. FIG. 5 is a schematic diagram illustrating a process of adding the model subunit in a two-dimensional plan view. In FIG. 5, the small triangle represents a preset object in space. When the distance between the first node and the small triangle becomes smaller until it is smaller than a preset distance value, one preset model subunit (a dotted diamond box) is added at the linkage node before the tail model subunit. The reason why it is added before the tail model subunit is that, usually, in the target rendering object model, the head model subunit and the tail model subunit are different in modeling structures, and the added preset model subunit is a uniformly set subunit. If the tail model subunit is identical to the preset model subunit, the preset model subunit may be added directly behind the tail model subunit, and the added preset model subunit may be served as a new tail model subunit.

S250: adding a plurality of nodes in the preset model subunit to the three-dimensional model of the target rendering object, and setting moving directions, moving distances and rotation angles for the newly added nodes in the current frame, to render the target rendering object.

After determining an adding position of the preset model subunit, initial values are assigned to rendering parameters of the model subunit. In one preset model subunit, it usually includes a plurality of nodes. The more the nodes, the less the corresponding skin coverage, the better the effect after rendering, and the more realistic the moving state of the target rendering object.

In order to avoid an abrupt rendering effect of the newly added model subunit, initial values of rendering parameters of a plurality of nodes of the newly added model subunit are usually set as values of the rendering parameters of the nodes of a previous model subunit adjacent to the newly added model subunit. For example, the coordinate positions and rotation angles of all nodes in the newly added preset model subunit are set to be identical to the corresponding values of a node before the tail model subunit. After the target rendering object is subjected to model updating, the rendering effect may present a dynamic growth effect of a Gluttonous Snake model.

In one embodiment, an animation effect may also be added to a non-node part in the three-dimensional model of the target rendering object. For example, the target rendering object is a worm, and non-node parts of the worm model include parts such as wings or tentacles of the worm; effects, such as wing flapping, may be added to these parts to enhance the overall vivid rendering effect.

The technical solution of the present embodiment is suitable for the target rendering object which is a streamlined object model, and the streamlined object is a dragon-shaped or snake-shaped object.

Figure 6:
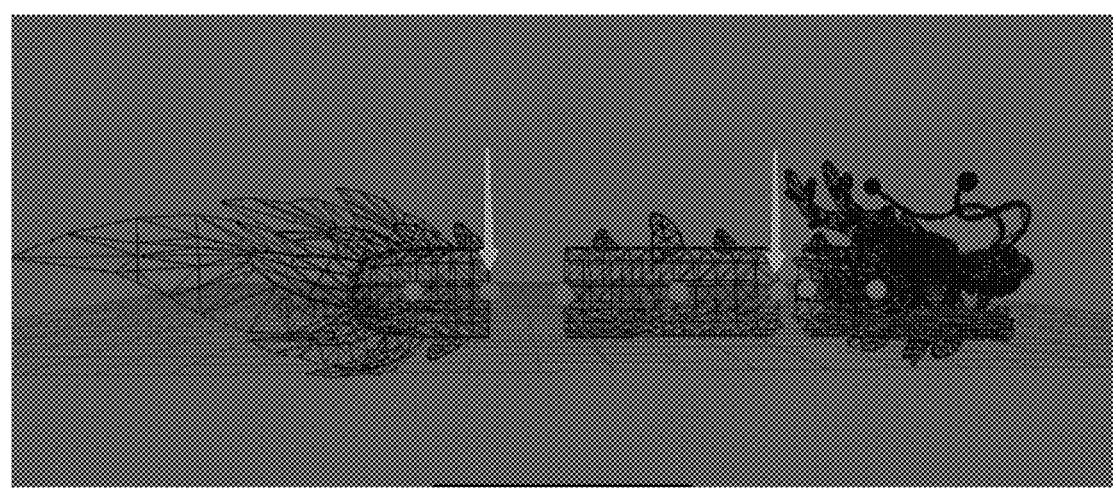
FIG. 6 is a schematic diagram of an example of a target rendering object provided by at least one embodiment of the present disclosure.

In one example, the target rendering object is a dragon, and a three-dimensional model of the dragon is shown in FIG. 6, where dots represent nodes in the three-dimensional model, and nodes at positions indicated by two arrows are positions of two linkage nodes. In FIG. 6, the dragon model is divided into three sections for display with the positions where the linkage nodes are located as dividing lines. These three sections are respectively a head model subunit, a middle body of the dragon obtained by linking a plurality of identical model subunits in the middle, and a tail model subunit.

Through the technical solution of the present embodiment, after the user triggers corresponding props or animations to display the target rendering object, an initial rendering state of the dragon may be displayed on the terminal screen; and then, during the process of interacting with the terminal interface, the user may drag the head of the dragon by hand to enable the dragon to move according to a sliding trajectory of a user gesture. During the process of moving the dragon, the client updates depth information of a first node of the three-dimensional model of the dragon (a first node of the head) in the current frame in each frame; then, the target coordinates of the first node in the world coordinate system corresponding to the current frame are determined according to the depth information and corresponding screen coordinates of the movement trajectory of the user gesture in the current frame; finally, based on the target coordinates and world coordinate system coordinates of a plurality of nodes in the three-dimensional model of the dragon in the previous frame of the current frame, the world coordinate system coordinates of the plurality of nodes in the current frame are concurrently updated, and during the coordinate updating process, the plurality of nodes are controlled to rotate according to the preset model node rotation strategy, to present the rendering effect of the three-dimensional dragon with depth change and position change.

The user can play mini games such as collecting gold coins by dragging the dragon to move, and positions of the gold coins are positions where node addition prompt information is preset, and when the dragon collects one gold coin, it can increase the length of the dragon by one unit. The unit length of the dragon's body corresponds to one preset model subunit. For example, the preset model subunit is added before the tail model subunit of the dragon, and rendering parameters of the model subunit are assigned with values, so that the rendering effect of a moving dragon with dynamically changing depth and growing body may be obtained. In addition, in the three-dimensional model of the dragon, the non-skeletal nodes such as horns, a tail and feet of the dragon may also be rendered with animation effects, which makes the rendering effect of the whole dragon more vivid.

Figure 7:
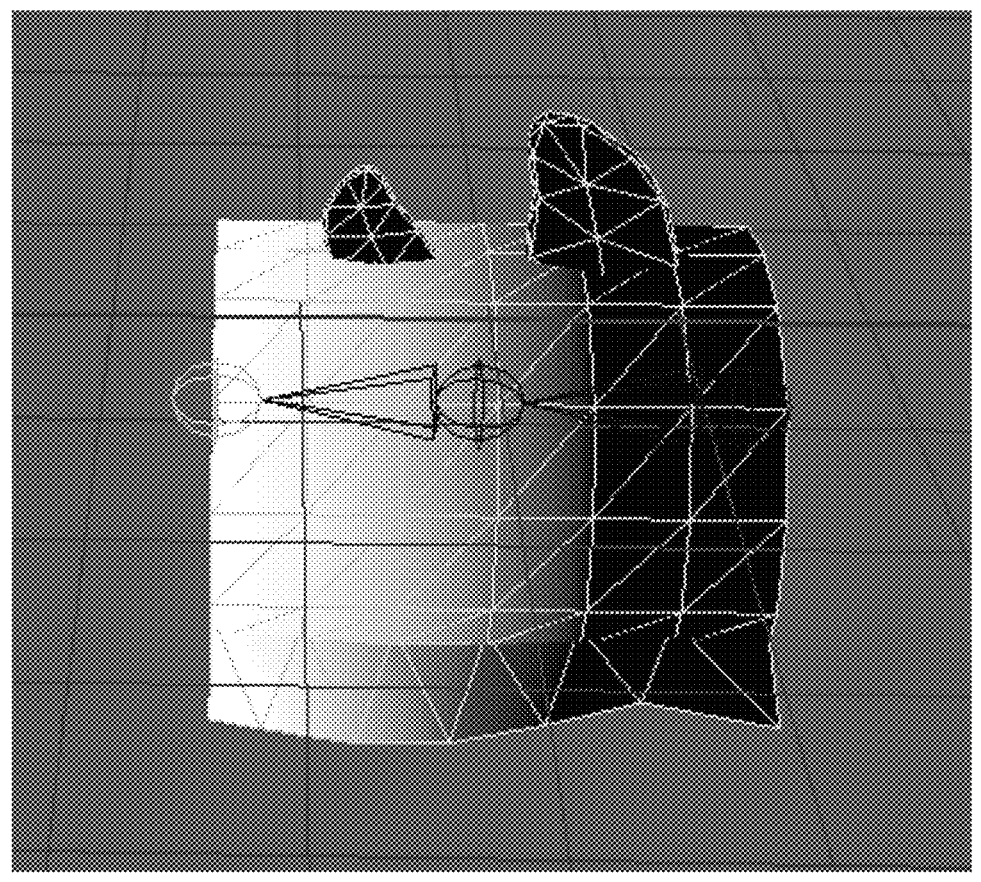
FIG. 7 is a schematic diagram of a skin structure of an example of a target rendering object provided by at least one embodiment of the present disclosure.

In order to make the dragon's motion, such as the rendering effect, more vivid and the dynamic changing effect smoother, the skin effect may be set as a structure shown in FIG. 7 covering the surface of the model, and the unit area of the skin should not be set too large.

According to the technical solutions of the embodiments of the present disclosure, if the user interacts with the target rendering object during the display process of the target rendering object, the interactive operation instruction from the user to control movement of the target rendering object may be acquired; then, during the interaction process of controlling movement of the target rendering object by the user, depth information of the first node of the three-dimensional model of the target rendering object in the current frame is updated for each frame of the target rendering object; the target coordinates of the first node in the world coordinate system corresponding to the current frame are determined according to the depth information and screen coordinates of a movement trajectory corresponding to the interactive operation instruction in the current frame; and by taking the target coordinates as an overall moving target position of the target rendering object, based on the target coordinates and world coordinate system coordinates of a plurality of nodes in the three-dimensional model in a previous frame of the current frame, world coordinate system coordinates of the plurality of nodes in the current frame are concurrently updated, and during the coordinate updating process, the plurality of nodes are controlled to rotate according to the preset model node rotation strategy to render the target rendering object, so that the rendering effect of the dynamic depth change and spiral motion may be obtained. In addition, in response to the distance between the coordinates of the first node and the position where node addition prompt information is preset being less than the preset distance threshold, a preset model subunit may be added before the linkage node of the tail model subunit of the three-dimensional model, so that the model of the target rendering object can be updated. The technical solutions of the embodiments of the present disclosure fill the gap in dynamic three-dimensional image rendering solution with depth variation, achieving a rendering method in a three-dimensional space with depth, so that the rendering object presents depth variation during a moving process of the corresponding trajectory, different parts of the rendering object also perform curvilinear motion during the moving process of the corresponding trajectory, and the model of the target rendering object may also dynamically grow.

Figure 8:
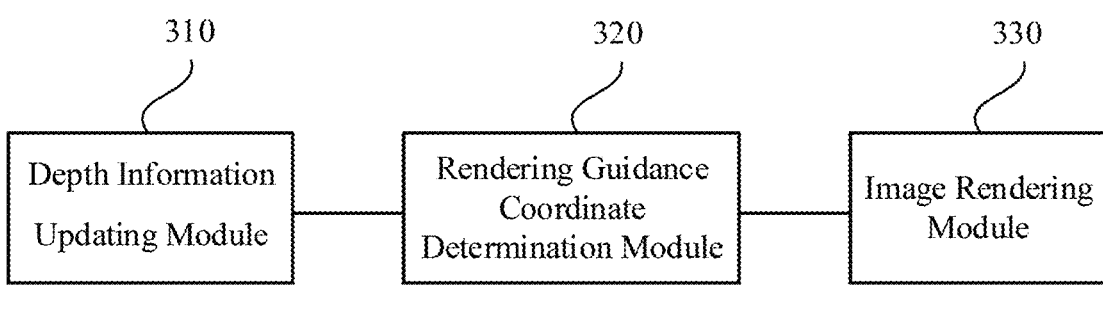
FIG. 8 is a schematic structural diagram of an image rendering apparatus provided by at least one embodiment of the present disclosure.

FIG. 8 is a schematic structural diagram of an image rendering apparatus provided by at least one embodiment of the present disclosure. The image rendering apparatus provided by the present embodiment is suitable for dynamic three-dimensional image rendering scenarios, for example, suitable for dynamic three-dimensional image rendering in some scenarios such as mini games, effects or props that enable interaction with users. The apparatus may be embodied in the form of software and/or hardware, and the apparatus may be configured in an electronic device, such as a mobile terminal or a server device.

As shown in FIG. 8, the image rendering apparatus includes a depth information updating module 310, a rendering guidance coordinate determination module 320, and an image rendering module 330.

The depth information updating module 310 is configured to, during a display process of a target rendering object, after acquiring an interactive operation instruction from a user to control movement of the target rendering object, update depth information of a first node of a three-dimensional model of the target rendering object in a current frame for each frame of the target rendering object; the rendering guidance coordinate determination module 320 is configured to determine target coordinates of the first node in a world coordinate system corresponding to the current frame, according to the depth information and screen coordinates of a movement trajectory corresponding to the interactive operation instruction in the current frame; and the image rendering module 330 is configured to, based on the target coordinates and world coordinate system coordinates of a plurality of nodes in the three-dimensional model in a previous frame of the current frame, concurrently update world coordinate system coordinates of the plurality of nodes in the current frame, and control, during a coordinate updating process, the plurality of nodes to rotate according to a preset model node rotation strategy to render the target rendering object.

According to the technical solutions of the embodiments of the present disclosure, if the user interacts with the target rendering object during the display process of the target rendering object, the interactive operation instruction from the user to control movement of the target rendering object may be acquired; then, during the interaction process of controlling movement of the target rendering object by the user, depth information of the first node of the three-dimensional model of the target rendering object in the current frame is updated for each frame of the target rendering object; the target coordinates of the first node in the world coordinate system corresponding to the current frame are determined according to the depth information and screen coordinates of a movement trajectory corresponding to the interactive operation instruction in the current frame; and by taking the target coordinates as an overall moving target position of the target rendering object, based on the target coordinates and world coordinate system coordinates of a plurality of nodes in the three-dimensional model in a previous frame of the current frame, world coordinate system coordinates of the plurality of nodes in the current frame are concurrently updated, and during the coordinate updating process, the plurality of nodes are controlled to rotate according to the preset model node rotation strategy to render the target rendering object, so that the rendering effect of the dynamic depth change and spiral motion may be obtained. The technical solutions of the embodiments of the present disclosure fill the gap in dynamic three-dimensional image rendering solution with depth variation, achieving a rendering method in a three-dimensional space with depth, so that the rendering object presents depth variation during a moving process of the corresponding trajectory, and different parts of the rendering object also perform curvilinear motion during the moving process of the corresponding trajectory.

In some embodiments, the depth information updating module 310 is configured to:

determine a node depth variable of the first node in the current frame, according to a cumulative display duration of the target rendering object from start of image display to the current frame; and superimpose the node depth variable on the basis of a preset depth constant, and update a superposition result as the depth information of the first node in the current frame.

In some embodiments, the image rendering module 330 is configured to:

determine a moving direction and a moving distance of the first node according to world coordinate system coordinates of the first node and the target coordinates in the previous frame, and enable the first node to move by a corresponding moving distance in a corresponding moving direction, to complete coordinate updating of the first node in the current frame; and for a plurality of nodes excluding the first node, determine a moving direction and a moving distance of each node according to world coordinate system coordinates of each node and a previous node adjacent to each node in the previous frame, and enable each node to move by a corresponding moving distance in a corresponding moving direction, to complete coordinate updating of the plurality of nodes in the current frame.

In some embodiments, the image rendering module 330 is configured to:

determine a first coordinate vector between the world coordinate system coordinates of the first node in the previous frame and the target coordinates; take a vector direction of the first coordinate vector as the moving direction of the first node; in response to a preset pixel movement unit distance being less than or equal to a vector length of the first coordinate vector, take the preset pixel movement unit distance as the moving distance of the first node in the corresponding moving direction; and in response to the preset pixel movement unit distance being greater than the vector length of the first coordinate vector, take the vector length of the first coordinate vector as the moving distance of the first node in the corresponding moving direction.

In some embodiments, the image rendering module 330 is configured to:

for the plurality of nodes excluding the first node, determine a second coordinate vector between the world coordinate system coordinates of each node and the previous node adjacent to each node in the previous frame; take a vector direction of the second coordinate vector as the moving direction of each node; in response to the preset pixel movement unit distance being less than or equal to a vector length of the second coordinate vector, take the preset pixel movement unit distance as the moving distance of each node in the corresponding moving direction; and in response to the preset pixel movement unit distance being greater than the vector length of the second coordinate vector, take the vector length of the second coordinate vector as the moving distance of each node in the corresponding moving direction.

In some embodiments, the image rendering module 330 is configured to:

in response to a node excluding the first node being not a linkage node between a plurality of model subunits of the three-dimensional model, determine whether a distance difference between the vector length of the second coordinate vector and a preset distance between adjacent nodes is greater than or equal to the preset pixel movement unit distance; in response to the distance difference between the vector length of the second coordinate vector and the preset distance between adjacent nodes being greater than or equal to the preset pixel movement unit distance, take the preset pixel movement unit distance as a moving distance of the node in the vector direction of the second coordinate vector; and in response to the distance difference between the vector length of the second coordinate vector and the preset distance between adjacent nodes being less than the preset pixel movement unit distance, take the distance difference as the moving distance of the node in the vector direction of the second coordinate vector.

In some embodiments, the image rendering module 330 is configured to:

during a process of the first node moving the corresponding moving distance in the corresponding moving direction, control the first node, towards the vector direction of the first coordinate vector, to rotate a preset angle around a preset coordinate axis of the target rendering object; and during a process of the plurality of nodes excluding the first node moving the corresponding moving distance in the corresponding moving direction, control each node, towards the vector direction of the second coordinate vector, to rotate around the preset coordinate axis of the target rendering object, where a rotation angle is an angle of the previous node adjacent to each node rotates during the coordinate updating process in the previous frame.

In some embodiments, the image rendering module 330 is configured to:

during a process of the node moving the corresponding moving distance in the corresponding moving direction, control the node to rotate towards a vector direction of a third coordinate vector between a next node and a previous node adjacent to the node in the previous frame, where a rotation angle is less than or equal to an angle of the previous node adjacent to the node rotates during the coordinate updating process in the previous frame.

In some embodiments, the image rendering apparatus further includes a rendering object model updating module, which is configured to:

in response to a distance between the world coordinate system coordinates of the first node and a position of a preset object in space being less than a preset distance threshold, add a preset model subunit before a linkage node of a tail model subunit of the three-dimensional model; and add a plurality of nodes in the preset model subunit to the three-dimensional model of the target rendering object, and set moving directions, moving distances and rotation angles for the newly added nodes in the current frame.

In some embodiments, the image rendering apparatus further includes an animation effect adding module, which is configured to add an animation effect for a non-node part in the three-dimensional model of the target rendering object.

In some embodiments, the target rendering object includes a streamlined object, and the streamlined object is a dragon-shaped or snake-shaped object.

The image rendering apparatus provided by the embodiment of the present disclosure is capable of executing the image rendering method provided by any embodiment of the present disclosure, and has corresponding functional modules for executing the method and effects.

The multiple units and modules included in the above apparatus are only divided according to functional logics, but not limited thereto, as long as the corresponding functions can be implemented; in addition, the names of the multiple functional units are only for the convenience of distinguishing between each other, and are not used to limit the protection scope of the disclosed embodiments.

Figure 9:
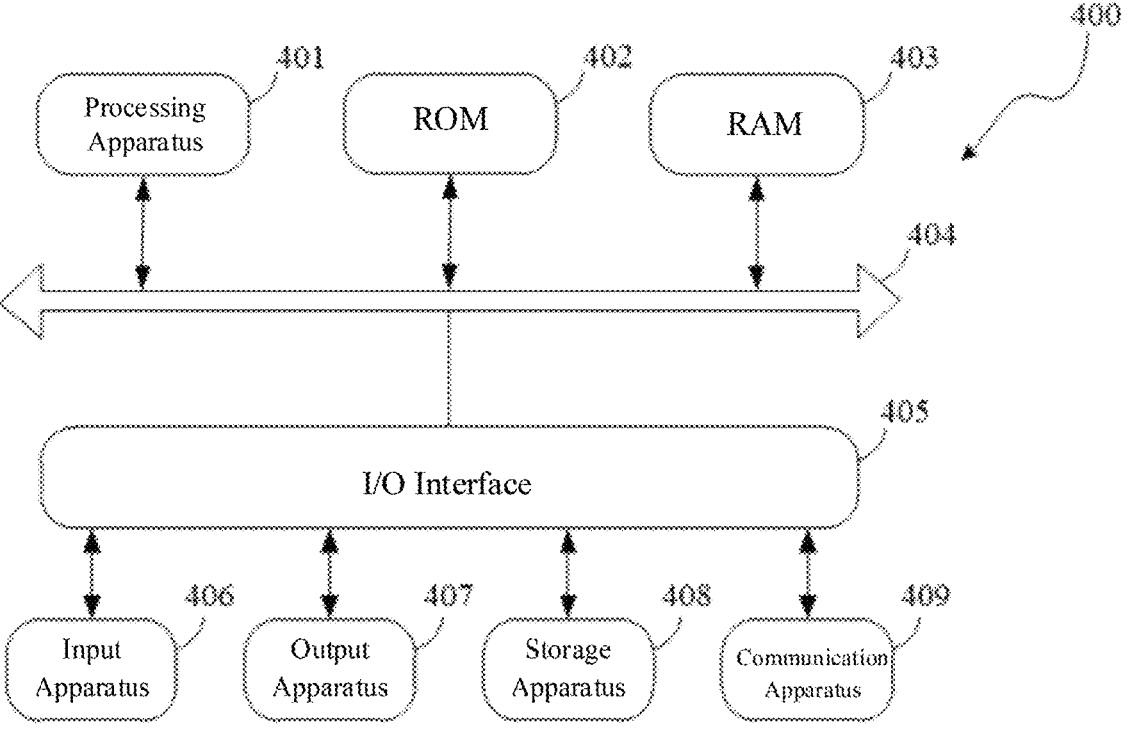
FIG. 9 is a schematic structural diagram of an electronic device provided by at least one embodiment of the present disclosure.

Referring to FIG. 9, FIG. 9 illustrates a schematic structural diagram of an electronic device 400 (such as a terminal device or server) suitable for implementing the embodiments of the present disclosure. The electronic devices in the embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), and fixed terminals such as a digital TV, a desktop computer, or the like. The electronic device 400 illustrated in FIG. 9 is merely an example, and should not pose any limitation to the functions and the range of use of the embodiments of the present disclosure.

As illustrated in FIG. 9, the electronic device 400 may include a processing apparatus 401 (e.g., a central processing unit, a graphics processing unit, etc.), which can perform various suitable actions and processing according to a program stored in a read-only memory (ROM) 402 or a program loaded from a storage apparatus 408 into a random-access memory (RAM) 403. The RAM 403 further stores various programs and data required for operations of the electronic device 400. The processing apparatus 401, the ROM 402, and the RAM 403 are interconnected through a bus 404. An input/output (I/O) interface 405 is also connected to the bus 404.

Usually, the following apparatuses may be connected to the I/O interface 405: an input apparatus 406 including, for example, a touch screen, a touch pad, a keyboard, a mouse, a camera, a microphone, an accelerometer, a gyroscope, or the like; an output apparatus 407 including, for example, a liquid crystal display (LCD), a loudspeaker, a vibrator, or the like; a storage apparatus 408 including, for example, a magnetic tape, a hard disk, or the like; and a communication apparatus 409. The communication apparatus 409 may allow the electronic device 400 to be in wireless or wired communication with other devices to exchange data. While FIG. 9 illustrates the electronic device 400 having various apparatuses, it should be understood that not all of the illustrated apparatuses are necessarily implemented or included. More or fewer apparatuses may be implemented or included alternatively.

According to the embodiments of the present disclosure, the processes described above with reference to the flowcharts may be implemented as a computer software program. For example, the embodiments of the present disclosure include a computer program product, which includes a computer program carried by a non-transitory computer-readable medium. The computer program includes program code for performing the methods shown in the flowcharts. In such embodiments, the computer program may be downloaded online through the communication apparatus 409 and installed, or may be installed from the storage apparatus 408, or may be installed from the ROM 402. When the computer program is executed by the processing apparatus 401, the above-mentioned functions defined in the methods of some embodiments of the present disclosure are performed.

The electronic device provided by the embodiments of the present disclosure and the image rendering method provided by the above embodiments belong to the same concept, and technical details not exhaustively described in the present embodiment may be referred to the above embodiments, and the present embodiment has the same beneficial effects as the above-mentioned embodiments.

The embodiments of the present disclosure further provide a computer storage medium storing a computer program, and the computer program, when executed by a processor, implements the image rendering method provided by the above-mentioned embodiments.

The above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementations, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to:

during a display process of a target rendering object, after acquiring an interactive operation instruction from a user to control movement of the target rendering object, update depth information of a first node of a three-dimensional model of the target rendering object in a current frame for each frame of the target rendering object; determine target coordinates of the first node in a world coordinate system corresponding to the current frame, according to the depth information and screen coordinates of a movement trajectory corresponding to the interactive operation instruction in the current frame; and based on the target coordinates and world coordinate system coordinates of a plurality of nodes in the three-dimensional model in a previous frame of the current frame, concurrently update world coordinate system coordinates of the plurality of nodes in the current frame, and control, during a coordinate updating process, the plurality of nodes to rotate according to a preset model node rotation strategy to render the target rendering object.

The computer program code for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, function, and operation of possible implementations of systems, methods, and computer program products according to various embodiments of the present disclosure. In this regard, each block in the flowcharts or block diagrams may represent a module, a program segment, or a portion of code, including one or more executable instructions for implementing specified logical functions. It should also be noted that, in some alternative implementations, the functions noted in the blocks may also occur out of the order noted in the drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, the data generation module may also be described as a "video data generation module."

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, Example 1 provides an image rendering method, and the method includes:

during a display process of a target rendering object, after acquiring an interactive operation instruction from a user to control movement of the target rendering object, updating depth information of a first node of a three-dimensional model of the target rendering object in a current frame for each frame of the target rendering object;

determining target coordinates of the first node in a world coordinate system corresponding to the current frame, according to the depth information and screen coordinates of a movement trajectory corresponding to the interactive operation instruction in the current frame; and based on the target coordinates and world coordinate system coordinates of a plurality of nodes in the three-dimensional model in a previous frame of the current frame, concurrently updating world coordinate system coordinates of the plurality of nodes in the current frame, and controlling, during a coordinate updating process, the plurality of nodes to rotate according to a preset model node rotation strategy to render the target rendering object.

According to one or more embodiments of the present disclosure, Example 2 provides an image rendering method, and the method further includes:

in some implementations, the updating depth information of the first node of the three-dimensional model of the target rendering object in the current frame, includes:

determining a node depth variable of the first node in the current frame, according to a cumulative display duration of the target rendering object from start of image display to the current frame; and superimposing the node depth variable on the basis of a preset depth constant, and updating a superposition result as the depth information of the first node in the current frame.

According to one or more embodiments of the present disclosure, Example 3 provides an image rendering method, and the method further includes:

in some implementations, based on the target coordinates and world coordinate system coordinates of a plurality of nodes in the three-dimensional model in a previous frame of the current frame, the concurrently updating world coordinate system coordinates of the plurality of nodes in the current frame, includes:

determining a moving direction and a moving distance of the first node according to world coordinate system coordinates of the first node and the target coordinates in the previous frame, and enabling the first node to move by a corresponding moving distance in a corresponding moving direction, to complete coordinate updating of the first node in the current frame; and for a plurality of nodes excluding the first node, determining a moving direction and a moving distance of each node according to world coordinate system coordinates of each node and a previous node adjacent to each node in the previous frame, and enabling each node to move by a corresponding moving distance in a corresponding moving direction, to complete coordinate updating of the plurality of nodes in the current frame.

According to one or more embodiments of the present disclosure, Example 4 provides an image rendering method, and the method further includes:

in some implementations, the determining the moving direction and the moving distance of the first node according to world coordinate system coordinates of the first node and the target coordinates in the previous frame, includes:

determining a first coordinate vector between the world coordinate system coordinates of the first node in the previous frame and the target coordinates;

taking a vector direction of the first coordinate vector as the moving direction of the first node;

in response to a preset pixel movement unit distance being less than or equal to a vector length of the first coordinate vector, taking the preset pixel movement unit distance as the moving distance of the first node in the corresponding moving direction; and in response to the preset pixel movement unit distance being greater than the vector length of the first coordinate vector, taking the vector length of the first coordinate vector as the moving distance of the first node in the corresponding moving direction.

According to one or more embodiments of the present disclosure, Example 5 provides an image rendering method, and the method further includes:

in some implementations, for the plurality of nodes excluding the first node, the determining the moving direction and the moving distance of each node according to world coordinate system coordinates of each node and the previous node adjacent to each node in the previous frame, includes:

for the plurality of nodes excluding the first node, determining a second coordinate vector between the world coordinate system coordinates of each node and the previous node adjacent to each node in the previous frame;

taking a vector direction of the second coordinate vector as the moving direction of each node;

in response to the preset pixel movement unit distance being less than or equal to a vector length of the second coordinate vector, taking the preset pixel movement unit distance as the moving distance of each node in the corresponding moving direction; and in response to the preset pixel movement unit distance being greater than the vector length of the second coordinate vector, taking the vector length of the second coordinate vector as the moving distance of each node in the corresponding moving direction.

According to one or more embodiments of the present disclosure, Example 6 provides an image rendering method, and the method further includes:

in some implementations, in response to a node excluding the first node being not a linkage node between a plurality of model subunits of the three-dimensional model, for the plurality of nodes excluding the first node, the determining the moving direction and the moving distance of each node according to world coordinate system coordinates of each node and the previous node adjacent to each node in the previous frame, further includes:

determining whether a distance difference between the vector length of the second coordinate vector and a preset distance between adjacent nodes is greater than or equal to the preset pixel movement unit distance;

in response to the distance difference between the vector length of the second coordinate vector and the preset distance between adjacent nodes being greater than or equal to the preset pixel movement unit distance, taking the preset pixel movement unit distance as a moving distance of the node in the vector direction of the second coordinate vector; and in response to the distance difference between the vector length of the second coordinate vector and the preset distance between adjacent nodes being less than the preset pixel movement unit distance, taking the distance difference as the moving distance of the node in the vector direction of the second coordinate vector.

According to one or more embodiments of the present disclosure, Example 7 provides an image rendering method, and the method further includes:

in some implementations, the controlling, during the coordinate updating process, the plurality of nodes to rotate according to the preset model node rotation strategy, includes:

during a process of the first node moving the corresponding moving distance in the corresponding moving direction, controlling the first node, towards the vector direction of the first coordinate vector, to rotate a preset angle around a preset coordinate axis of the target rendering object; and during a process of the plurality of nodes excluding the first node moving the corresponding moving distance in the corresponding moving direction, controlling each node, towards the vector direction of the second coordinate vector, to rotate around the preset coordinate axis of the target rendering object, wherein a rotation angle is an angle of the previous node adjacent to each node rotates during the coordinate updating process in the previous frame.

According to one or more embodiments of the present disclosure, Example 8 provides an image rendering method, and the method further includes:

in some implementations, in response to a node excluding the first node being not a linkage node between a plurality of model subunits of the three-dimensional model, the controlling, during the coordinate updating process, the plurality of nodes to rotate according to the preset model node rotation strategy, further includes:

during a process of the node moving the corresponding moving distance in the corresponding moving direction, controlling the node to rotate towards a vector direction of a third coordinate vector between a next node and a previous node adjacent to the node in the previous frame, wherein a rotation angle is less than or equal to an angle of the previous node adjacent to the node rotates during the coordinate updating process in the previous frame.

According to one or more embodiments of the present disclosure, Example 9 provides an image rendering method, and the method further includes:

in some implementations, the method further includes:

in response to a distance between the world coordinate system coordinates of the first node and a position of a preset object in space being less than a preset distance threshold, adding a preset model subunit before a linkage node of a tail model subunit of the three-dimensional model; and adding a plurality of nodes in the preset model subunit to the three-dimensional model of the target rendering object, and setting moving directions, moving distances and rotation angles for the newly added nodes in the current frame.

According to one or more embodiments of the present disclosure, Example 10 provides an image rendering method, and the method further includes:

in some implementations, the method further includes:

adding an animation effect for a non-node part in the three-dimensional model of the target rendering object.

According to one or more embodiments of the present disclosure, Example 11 provides an image rendering method, and the method further includes:

in some implementations, the target rendering object comprises a streamlined object, and the streamlined object is a dragon-shaped or snake-shaped object.

According to one or more embodiments of the present disclosure, Example 12 provides an image rendering apparatus, and the apparatus includes:

a depth information updating module, configured to, during a display process of a target rendering object, after acquiring an interactive operation instruction from a user to control movement of the target rendering object, update depth information of a first node of a three-dimensional model of the target rendering object in a current frame for each frame of the target rendering object;

a rendering guidance coordinate determination module, configured to determine target coordinates of the first node in a world coordinate system corresponding to the current frame, according to the depth information and screen coordinates of a movement trajectory corresponding to the interactive operation instruction in the current frame; and an image rendering module, configured to, based on the target coordinates and world coordinate system coordinates of a plurality of nodes in the three-dimensional model in a previous frame of the current frame, concurrently update world coordinate system coordinates of the plurality of nodes in the current frame, and control, during a coordinate updating process, the plurality of nodes to rotate according to a preset model node rotation strategy to render the target rendering object.

According to one or more embodiments of the present disclosure, Example 13 provides an image rendering apparatus, and the apparatus further includes:

in some implementations, the depth information updating module is configured to:

determine a node depth variable of the first node in the current frame, according to a cumulative display duration of the target rendering object from start of image display to the current frame; and superimpose the node depth variable on the basis of a preset depth constant, and update a superposition result as the depth information of the first node in the current frame.

According to one or more embodiments of the present disclosure, Example 14 provides an image rendering apparatus, and the apparatus further includes:

in some implementations, the image rendering module is configured to:

determine a moving direction and a moving distance of the first node according to world coordinate system coordinates of the first node and the target coordinates in the previous frame, and enable the first node to move by a corresponding moving distance in a corresponding moving direction, to complete coordinate updating of the first node in the current frame; and for a plurality of nodes excluding the first node, determine a moving direction and a moving distance of each node according to world coordinate system coordinates of each node and a previous node adjacent to each node in the previous frame, and enable each node to move by a corresponding moving distance in a corresponding moving direction, to complete coordinate updating of the plurality of nodes in the current frame.

According to one or more embodiments of the present disclosure, Example 15 provides an image rendering apparatus, and the apparatus further includes:

in some implementations, the image rendering module is configured to:

determine a first coordinate vector between the world coordinate system coordinates of the first node in the previous frame and the target coordinates;

take a vector direction of the first coordinate vector as the moving direction of the first node;

in response to a preset pixel movement unit distance being less than or equal to a vector length of the first coordinate vector, take the preset pixel movement unit distance as the moving distance of the first node in the corresponding moving direction; and in response to the preset pixel movement unit distance being greater than the vector length of the first coordinate vector, take the vector length of the first coordinate vector as the moving distance of the first node in the corresponding moving direction.

According to one or more embodiments of the present disclosure, Example 16 provides an image rendering apparatus, and the apparatus further includes:

in some implementations, the image rendering module is configured to:

for the plurality of nodes excluding the first node, determine a second coordinate vector between the world coordinate system coordinates of each node and the previous node adjacent to each node in the previous frame;

take a vector direction of the second coordinate vector as the moving direction of each node;

in response to the preset pixel movement unit distance being less than or equal to a vector length of the second coordinate vector, take the preset pixel movement unit distance as the moving distance of each node in the corresponding moving direction; and in response to the preset pixel movement unit distance being greater than the vector length of the second coordinate vector, take the vector length of the second coordinate vector as the moving distance of each node in the corresponding moving direction.

According to one or more embodiments of the present disclosure, Example 17 provides an image rendering apparatus, and the apparatus further includes:

in some implementations, the image rendering module is configured to:

in response to a node excluding the first node being not a linkage node between a plurality of model subunits of the three-dimensional model, determine whether a distance difference between the vector length of the second coordinate vector and a preset distance between adjacent nodes is greater than or equal to the preset pixel movement unit distance;

in response to the distance difference between the vector length of the second coordinate vector and the preset distance between adjacent nodes being greater than or equal to the preset pixel movement unit distance, take the preset pixel movement unit distance as a moving distance of the node in the vector direction of the second coordinate vector; and in response to the distance difference between the vector length of the second coordinate vector and the preset distance between adjacent nodes being less than the preset pixel movement unit distance, take the distance difference as the moving distance of the node in the vector direction of the second coordinate vector.

According to one or more embodiments of the present disclosure, Example 18 provides an image rendering apparatus, and the apparatus further includes:

in some implementations, the image rendering module is configured to:

during a process of the first node moving the corresponding moving distance in the corresponding moving direction, control the first node, towards the vector direction of the first coordinate vector, to rotate a preset angle around a preset coordinate axis of the target rendering object; and during a process of the plurality of nodes excluding the first node moving the corresponding moving distance in the corresponding moving direction, control each node, towards the vector direction of the second coordinate vector, to rotate around the preset coordinate axis of the target rendering object, where a rotation angle is an angle of the previous node adjacent to each node rotates during the coordinate updating process in the previous frame.

According to one or more embodiments of the present disclosure, Example 19 provides an image rendering apparatus, and the apparatus further includes:

in some implementations, the image rendering module is configured to:

during a process of the node moving the corresponding moving distance in the corresponding moving direction, control the node to rotate towards a vector direction of a third coordinate vector between a next node and a previous node adjacent to the node in the previous frame, where a rotation angle is less than or equal to an angle of the previous node adjacent to the node rotates during the coordinate updating process in the previous frame.

According to one or more embodiments of the present disclosure, Example 20 provides an image rendering apparatus, and the apparatus further includes:

in some implementations, the image rendering apparatus further includes a rendering object model updating module, which is configured to:

in response to a distance between the world coordinate system coordinates of the first node and a position of a preset object in space being less than a preset distance threshold, add a preset model subunit before a linkage node of a tail model subunit of the three-dimensional model; and add a plurality of nodes in the preset model subunit to the three-dimensional model of the target rendering object, and set moving directions, moving distances and rotation angles for the newly added nodes in the current frame.

According to one or more embodiments of the present disclosure, Example 21 provides an image rendering apparatus, and the apparatus further includes:

in some implementations, the image rendering apparatus further includes an animation effect adding module, which is configured to add an animation effect for a non-node part in the three-dimensional model of the target rendering object.

According to one or more embodiments of the present disclosure, Example 22 provides an image rendering apparatus, and the apparatus further includes:

in some implementations, the target rendering object includes a streamlined object, and the streamlined object is a dragon-shaped or snake-shaped object.

Moreover, although the multiple operations are depicted in a particular order, this should not be understood as requiring that these operations be performed in the particular order shown or in a sequential order. Under certain circumstances, multitasking and parallel processing may be beneficial. Likewise, while multiple implementation details are included in the above discussion, these should not be construed as limitations on the scope of the present disclosure. Some features described in the context of separate embodiments can also be combined in a single embodiment. On the contrary, various features that are described in the context of a single embodiment can also be implemented in multiple embodiments separately or in any suitable sub-combination.

What is claimed is:

1. An image rendering method, comprising:

in response to acquiring an interactive operation instruction from a user to control movement of a target rendering object, updating depth information of a first node of a three-dimensional model of the target rendering object in a current frame for the target rendering object;

determining target coordinates of the first node in a world coordinate system corresponding to the current frame, according to the depth information and screen coordinates of a movement trajectory corresponding to the interactive operation instruction in the current frame; and based on the target coordinates and world coordinate system coordinates of a plurality of nodes in the three-dimensional model in a previous frame of the current frame, concurrently updating world coordinate system coordinates of the plurality of nodes in the current frame, and controlling the plurality of nodes to rotate according to a preset model node rotation strategy to render the target rendering object.

2. The method according to claim 1, wherein the updating depth information of the first node of the three-dimensional model of the target rendering object in the current frame, comprises:

determining a node depth variable of the first node in the current frame, according to a cumulative display duration of the target rendering object from start of image display to the current frame; and superimposing the node depth variable on the basis of a preset depth constant, and updating a superposition result as the depth information of the first node in the current frame.

3. The method according to claim 1, wherein based on the target coordinates and world coordinate system coordinates of a plurality of nodes in the three-dimensional model in a previous frame of the current frame, the concurrently updating world coordinate system coordinates of the plurality of nodes in the current frame, comprises:

determining a moving direction and a moving distance of the first node according to world coordinate system coordinates of the first node and the target coordinates in the previous frame, and enabling the first node to move by a corresponding moving distance in a corresponding moving direction, to complete coordinate updating of the first node in the current frame; and for a plurality of nodes excluding the first node, determining a moving direction and a moving distance of each node according to world coordinate system coordinates of each node and a previous node adjacent to each node in the previous frame, and enabling each node to move by a corresponding moving distance in a corresponding moving direction, to complete coordinate updating of the plurality of nodes in the current frame.

4. The method according to claim 3, wherein the determining the moving direction and the moving distance of the first node according to world coordinate system coordinates of the first node and the target coordinates in the previous frame, comprises:

determining a first coordinate vector between the world coordinate system coordinates of the first node in the previous frame and the target coordinates;

taking a vector direction of the first coordinate vector as the moving direction of the first node;

in response to a preset pixel movement unit distance being less than or equal to a vector length of the first coordinate vector, taking the preset pixel movement unit distance as the moving distance of the first node in the corresponding moving direction; and in response to the preset pixel movement unit distance being greater than the vector length of the first coordinate vector, taking the vector length of the first coordinate vector as the moving distance of the first node in the corresponding moving direction.

5. The method according to claim 4, wherein for the plurality of nodes excluding the first node, the determining the moving direction and the moving distance of each node according to world coordinate system coordinates of each node and the previous node adjacent to each node in the previous frame, comprises:

for the plurality of nodes excluding the first node, determining a second coordinate vector between the world coordinate system coordinates of each node and the previous node adjacent to each node in the previous frame;

taking a vector direction of the second coordinate vector as the moving direction of each node;

in response to the preset pixel movement unit distance being less than or equal to a vector length of the second coordinate vector, taking the preset pixel movement unit distance as the moving distance of each node in the corresponding moving direction; and in response to the preset pixel movement unit distance being greater than the vector length of the second coordinate vector, taking the vector length of the second coordinate vector as the moving distance of each node in the corresponding moving direction.

6. The method according to claim 5, wherein in response to a node excluding the first node being not a linkage node between a plurality of model subunits of the three-dimensional model, for the plurality of nodes excluding the first node, the determining the moving direction and the moving distance of each node according to world coordinate system coordinates of each node and the previous node adjacent to each node in the previous frame, further comprises:

determining whether a distance difference between the vector length of the second coordinate vector and a preset distance between adjacent nodes is greater than or equal to the preset pixel movement unit distance;

in response to the distance difference between the vector length of the second coordinate vector and the preset distance between adjacent nodes being greater than or equal to the preset pixel movement unit distance, taking the preset pixel movement unit distance as a moving distance of the node in the vector direction of the second coordinate vector; and in response to the distance difference between the vector length of the second coordinate vector and the preset distance between adjacent nodes being less than the preset pixel movement unit distance, taking the distance difference as the moving distance of the node in the vector direction of the second coordinate vector.

7. The method according to claim 6, wherein the controlling the plurality of nodes to rotate according to the preset model node rotation strategy, comprises:

during a process of the first node moving the corresponding moving distance in the corresponding moving direction, controlling the first node, towards the vector direction of the first coordinate vector, to rotate a preset angle around a preset coordinate axis of the target rendering object; and during a process of the plurality of nodes excluding the first node moving the corresponding moving distance in the corresponding moving direction, controlling each node, towards the vector direction of the second coordinate vector, to rotate a rotation angle around the preset coordinate axis of the target rendering object, wherein the rotation angle is an angle of the previous node adjacent to each node rotates in the previous frame.

8. The method according to claim 7, wherein in response to a node excluding the first node being not a linkage node between a plurality of model subunits of the three-dimensional model, the controlling the plurality of nodes to rotate according to the preset model node rotation strategy, further comprises:

during a process of the node moving the corresponding moving distance in the corresponding moving direction, controlling the node to rotate a rotation angle towards a vector direction of a third coordinate vector between a next node and a previous node adjacent to the node in the previous frame, wherein the rotation angle is less than or equal to an angle of the previous node adjacent to the node rotates in the previous frame.

9. The method according to claim 1, further comprising:

in response to a distance between the world coordinate system coordinates of the first node and a position of a preset object in space being less than a preset distance threshold, adding a preset model subunit before a linkage node of a tail model subunit of the three-dimensional model; and adding a plurality of nodes in the preset model subunit to the three-dimensional model of the target rendering object, and setting moving directions, moving distances and rotation angles for the newly added nodes in the current frame.

10. The method according to claim 9, further comprising: adding an animation effect for a non-node part in the three-dimensional model of the target rendering object.

11. The method according to claim 10, wherein the target rendering object comprises a streamlined object, and the streamlined object is a dragon-shaped or snake-shaped object.

12. An electronic device, comprising:

at least one processor; and at least one storage apparatus, configured to store at least one program, wherein the at least one program, when executed by the at least one processor, enables the at least one processor to implement an image rendering method, which comprises:

in response to acquiring an interactive operation instruction from a user to control movement of a target rendering object, updating depth information of a first node of a three-dimensional model of the target rendering object in a current frame for the target rendering object;

determining target coordinates of the first node in a world coordinate system corresponding to the current frame, according to the depth information and screen coordinates of a movement trajectory corresponding to the interactive operation instruction in the current frame; and based on the target coordinates and world coordinate system coordinates of a plurality of nodes in the three-dimensional model in a previous frame of the current frame, concurrently updating world coordinate system coordinates of the plurality of nodes in the current frame, and controlling the plurality of nodes to rotate according to a preset model node rotation strategy to render the target rendering object.

13. The electronic device according to claim 12, wherein the updating depth information of the first node of the three-dimensional model of the target rendering object in the current frame, comprises:

determining a node depth variable of the first node in the current frame, according to a cumulative display duration of the target rendering object from start of image display to the current frame; and superimposing the node depth variable on the basis of a preset depth constant, and updating a superposition result as the depth information of the first node in the current frame.

14. The electronic device according to claim 12, wherein based on the target coordinates and world coordinate system coordinates of a plurality of nodes in the three-dimensional model in a previous frame of the current frame, the concurrently updating world coordinate system coordinates of the plurality of nodes in the current frame, comprises:

determining a moving direction and a moving distance of the first node according to world coordinate system coordinates of the first node and the target coordinates in the previous frame, and enabling the first node to move by a corresponding moving distance in a corresponding moving direction, to complete coordinate updating of the first node in the current frame; and for a plurality of nodes excluding the first node, determining a moving direction and a moving distance of each node according to world coordinate system coordinates of each node and a previous node adjacent to each node in the previous frame, and enabling each node to move by a corresponding moving distance in a corresponding moving direction, to complete coordinate updating of the plurality of nodes in the current frame.

15. The electronic device according to claim 14, wherein the determining the moving direction and the moving distance of the first node according to world coordinate system coordinates of the first node and the target coordinates in the previous frame, comprises:

determining a first coordinate vector between the world coordinate system coordinates of the first node in the previous frame and the target coordinates;

taking a vector direction of the first coordinate vector as the moving direction of the first node;

in response to a preset pixel movement unit distance being less than or equal to a vector length of the first coordinate vector, taking the preset pixel movement unit distance as the moving distance of the first node in the corresponding moving direction; and in response to the preset pixel movement unit distance being greater than the vector length of the first coordinate vector, taking the vector length of the first coordinate vector as the moving distance of the first node in the corresponding moving direction.

16. The electronic device according to claim 15, wherein for the plurality of nodes excluding the first node, the determining the moving direction and the moving distance of each node according to world coordinate system coordinates of each node and the previous node adjacent to each node in the previous frame, comprises:

for the plurality of nodes excluding the first node, determining a second coordinate vector between the world coordinate system coordinates of each node and the previous node adjacent to each node in the previous frame;

taking a vector direction of the second coordinate vector as the moving direction of each node;

in response to the preset pixel movement unit distance being less than or equal to a vector length of the second coordinate vector, taking the preset pixel movement unit distance as the moving distance of each node in the corresponding moving direction; and in response to the preset pixel movement unit distance being greater than the vector length of the second coordinate vector, taking the vector length of the second coordinate vector as the moving distance of each node in the corresponding moving direction.

17. The electronic device according to claim 16, wherein in response to a node excluding the first node being not a linkage node between a plurality of model subunits of the three-dimensional model, for the plurality of nodes excluding the first node, the determining the moving direction and the moving distance of each node according to world coordinate system coordinates of each node and the previous node adjacent to each node in the previous frame, further comprises:

determining whether a distance difference between the vector length of the second coordinate vector and a preset distance between adjacent nodes is greater than or equal to the preset pixel movement unit distance;

in response to the distance difference between the vector length of the second coordinate vector and the preset distance between adjacent nodes being greater than or equal to the preset pixel movement unit distance, taking the preset pixel movement unit distance as a moving distance of the node in the vector direction of the second coordinate vector; and in response to the distance difference between the vector length of the second coordinate vector and the preset distance between adjacent nodes being less than the preset pixel movement unit distance, taking the distance difference as the moving distance of the node in the vector direction of the second coordinate vector.

18. The electronic device according to claim 17, wherein the controlling the plurality of nodes to rotate according to the preset model node rotation strategy, comprises:

during a process of the first node moving the corresponding moving distance in the corresponding moving direction, controlling the first node, towards the vector direction of the first coordinate vector, to rotate a preset angle around a preset coordinate axis of the target rendering object; and during a process of the plurality of nodes excluding the first node moving the corresponding moving distance in the corresponding moving direction, controlling each node, towards the vector direction of the second coordinate vector, to rotate a rotation angle around the preset coordinate axis of the target rendering object, wherein the rotation angle is an angle of the previous node adjacent to each node rotates in the previous frame.

19. The electronic device according to claim 18, wherein in response to a node excluding the first node being not a linkage node between a plurality of model subunits of the three-dimensional model, the controlling the plurality of nodes to rotate according to the preset model node rotation strategy, further comprises:

during a process of the node moving the corresponding moving distance in the corresponding moving direction, controlling the node to rotate a rotation angle towards a vector direction of a third coordinate vector between a next node and a previous node adjacent to the node in the previous frame, wherein the rotation angle is less than or equal to an angle of the previous node adjacent to the node rotates in the previous frame.

20. A non-transitory storage medium, comprising computer-executable instructions, wherein the computer-executable instructions, when executed by a computer processor, are configured to execute an image rendering method, which comprises:

in response to acquiring an interactive operation instruction from a user to control movement of a target rendering object, updating depth information of a first node of a three-dimensional model of the target rendering object in a current frame for the target rendering object;

determining target coordinates of the first node in a world coordinate system corresponding to the current frame, according to the depth information and screen coordinates of a movement trajectory corresponding to the interactive operation instruction in the current frame; and based on the target coordinates and world coordinate system coordinates of a plurality of nodes in the three-dimensional model in a previous frame of the current frame, concurrently updating world coordinate system coordinates of the plurality of nodes in the current frame, and controlling the plurality of nodes to rotate according to a preset model node rotation strategy to render the target rendering object.

* * * * *